(12) United States Patent
Chang et al.

(10) Patent No.: US 6,558,454 B1
(45) Date of Patent: *May 6, 2003

(54) METHOD FOR REMOVAL OF VAPOR PHASE CONTAMINANTS FROM A GAS STREAM BY IN-SITU ACTIVATION OF CARBON-BASED SORBENTS

(75) Inventors: Ramsay Chang, Los Altos, CA (US); Massoud Rostam-Abadi, Champaign, IL (US); Sharon Sjostrom, Denver, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 09/795,343

(22) Filed: Feb. 27, 2001

Related U.S. Application Data

(63) Continuation-in-part of application No. 09/259,671, filed on Feb. 26, 1999, now Pat. No. 6,451,094, which is a continuation-in-part of application No. 08/914,476, filed on Aug. 19, 1997, now abandoned.

(51) Int. Cl.⁷ .................. B01D 53/02; B01D 59/26; B01D 47/00; F23B 7/00; B01J 20/02
(52) U.S. Cl. ............... 95/901; 95/134; 95/900; 110/342; 110/345; 110/348; 423/210; 423/215.5; 423/239.1; 502/418; 502/430; 502/431; 502/432; 502/435
(58) Field of Search .................. 95/901, 134, 900; 110/342, 345, 348; 423/210, 215.5, 239.1; 502/418, 430, 431, 432, 435

(56) References Cited

U.S. PATENT DOCUMENTS 3,541,025 A    11/1970  Oda et al. ................... 252/421
3,793,806 A    2/1974   Fornoff .......................... 55/72
3,951,856 A    4/1976   Repik et al. ................. 252/421
4,045,368 A    8/1977   Katori et al. ................ 252/421

(List continued on next page.)

OTHER PUBLICATIONS

U.S. patent application Ser. No. 09/259,671, Chang et al., filed Feb. 26, 1999.
Chang et al., Pilot Scale Evaluation of Carbon Compound Additives for the Removal of Trace Metals at Coal–Fired Utility Power PlantsI,: *Second International Conference on Managing Hazardous Air Pollutants*, Jul. 1993, pp. VI–41 to VI–57.
"Activated Carbon," *Kirk–Othmer Encyclopedia of Chemical Technology* 4th. Ed., vol. 4, 1992, pp. 1015–1037.
U.S. patent application Ser. No. 10/052,421, Chang et al., filed Jan. 17, 2002.
U.S. patent application Ser. No. 10/124,000, Chang et al., filed Apr. 16, 2002.

*Primary Examiner*—Wayne A. Langel
*Assistant Examiner*—Jonas N. Strickland
(74) *Attorney, Agent, or Firm*—Pennie & Edmonds LLP

(57) ABSTRACT

A process for removing vapor phase contaminants from a gas stream includes the step of adding a raw carbonaceous starting material into a gas stream having an activation temperature sufficient to convert the raw carbonaceous starting material into an activated material in-situ. The raw carbonaceous starting material can be either a solid-phase, liquid phase or vapor-phase material. The activated material then adsorbs the vapor phase contaminants, and the activation material containing the vapor phase contaminants is removed from the gas stream using a particulate collection device. The process is particularly suited for the removal of vapor phase air toxics, such as mercury, from the flue gas of a combustion process. An apparatus for the removal of vapor phase contaminants from a gas stream is also described.

23 Claims, 5 Drawing Sheets

U.S. PATENT DOCUMENTS

| | | |
|---|---|---|
| 4,491,609 A | 1/1985 | Degel et al. ................ 427/215 |
| 4,500,327 A | 2/1985 | Nishino et al. ................ 55/72 |
| 4,617,035 A | 10/1986 | Wakaizumi et al. .......... 55/389 |
| 4,690,914 A | 9/1987 | Callut et al. ................ 502/400 |
| 4,883,499 A | 11/1989 | Beierle et al. ................ 48/203 |
| 4,889,698 A | 12/1989 | Moller et al. ................ 423/210 |
| 4,921,826 A | 5/1990 | Juntgen et al. ............. 502/180 |
| 4,921,831 A | 5/1990 | Nakai et al. ................ 502/418 |
| 4,987,115 A | 1/1991 | Michel-Kim ................ 502/419 |
| 5,064,805 A | 11/1991 | Otowa ........................ 502/427 |
| 5,089,030 A | 2/1992 | Michel-Kim ................... 48/76 |
| 5,124,292 A | 6/1992 | Larsen et al. ................. 502/38 |
| 5,164,355 A | 11/1992 | Farris et al. ................ 502/420 |
| 5,187,141 A | 2/1993 | Jha et al. .................... 502/432 |
| 5,287,383 A | 2/1994 | Hirai ........................... 373/112 |
| 5,304,527 A | 4/1994 | Dimitri ....................... 502/425 |
| 5,306,675 A | 4/1994 | Wu et al. ....................... 502/5 |
| 5,312,599 A | 5/1994 | Schwartz, Jr. .............. 422/209 |
| 5,352,370 A | 10/1994 | Hayden ..................... 210/763 |
| 5,352,647 A | 10/1994 | Suchenwirth ............... 502/417 |
| 5,354,363 A | 10/1994 | Brown, Jr. et al. ........... 95/134 |
| 5,364,821 A | 11/1994 | Holland .......................... 502/5 |
| 5,370,720 A | 12/1994 | Duncan ....................... 55/222 |
| 5,406,006 A | 4/1995 | Hill et al. .................... 568/882 |
| 5,409,522 A | 4/1995 | Durham et al. .............. 75/670 |
| 5,438,029 A | 8/1995 | Kobata et al. .............. 502/430 |
| 5,444,031 A | 8/1995 | Hayden ...................... 502/180 |
| 5,505,766 A | 4/1996 | Chang .......................... 95/134 |
| 5,538,932 A | 7/1996 | Yan et al. .................... 502/424 |
| 5,569,436 A | 10/1996 | Lerner ....................... 422/170 |
| 5,575,982 A | 11/1996 | Reiss et al. .................. 428/210 |
| 5,672,323 A | 9/1997 | Bhat et al. .................. 422/172 |
| 5,733,515 A | 3/1998 | Doughty et al. ............ 423/210 |
| 5,827,352 A | 10/1998 | Altman et al. ................. 95/58 |
| 5,854,173 A | 12/1998 | Chang et al. ............... 502/417 |
| 5,948,143 A | 9/1999 | Sjostrom et al. .............. 95/134 |
| 6,103,205 A | 8/2000 | Wojtowicz et al. .......... 423/210 |
| 6,451,094 B1 * | 9/2002 | Chang et al. |

* cited by examiner

US 6,558,454 B1

METHOD FOR REMOVAL OF VAPOR PHASE CONTAMINANTS FROM A GAS STREAM BY IN-SITU ACTIVATION OF CARBON-BASED SORBENTS

This application is a continuation-in-part of U.S. Ser. No. 09/259,671, filed Feb. 26, 1999 now U.S. Pat. No. 6,451, 094, which is a continuation-in-part of U.S. Ser. No. 08/914, 476, filed Aug. 19, 1997, now abandoned.

BACKGROUND OF THE INVENTION

1. Field of the Invention

This invention relates generally to the removal of vapor phase contaminants from a gas stream. More particularly, this invention relates to the removal of trace amounts of vapor phase air toxics, such as mercury, from the flue gas of a combustion process.

2. Description of the Related Art

The 1990 Clean Air Act Amendments, Title III, require major sources of air emissions to limit the discharge of certain chemical species. Certain of these chemical species are categorized as air toxics, and major sources are required to limit emissions to 10 tons per year for any given air toxin. Certain of these species may be present in the flue gas emitted from combustion processes. Therefore, cost-effective methods for controlling emissions of these species are of significant interest to the operators of these processes.

Air toxics and other species regulated by the 1990 Clean Air Act Amendments can be distributed in both the vapor phase and the solid phase in the flue gas from a combustion process. Typically, the air toxics are concentrated in the solid phase or particulate matter and can be effectively removed by the use of a particulate collection device, such as an electrostatic precipitator or fabric filter. Air toxics, such as mercury, that are present in the vapor phase are typically fob in very low concentrations, for example, parts per million or less, making removal difficult.

Some techniques that are being evaluated for the removal of vapor phase species found at these low concentrations include the use of wet scrubbing systems or packed bed adsorption systems. Wet scrubbing systems are typically used to remove vapor phase species, such as sulfur dioxide that are present in higher concentrations than air toxics, such as mercury. Therefore, these systems may not provide the necessary removal efficiency for air toxics, such as mercury. Packed bed adsorption systems typically employ sorbents, such as activated carbon, for the removal of certain vapor phase species including mercury, but operation of such systems results in a high pressure drop and the necessity to regenerate or replace the sorbent material.

Other processes utilize injection of a fine powdered sorbent material, such as activated carbon, into a flue gas to react with vapor phase species. The sorbents are then collected in a downstream particulate collection device, such as a fabric filter or an electrostatic precipitator. Moller, et al. (U.S. Pat. No. 4,889,698) discloses a process in which powdery activated carbon is injected immediately before, during or after an alkali reagent (limestone or sodium carbonate) spray dryer for simultaneous removal of acid gases and trace contaminants, such as mercury. The process requires the cooling of the flue gas by spray drying and the presence of large amounts of alkali sorbent material together with the activated carbon to enhance overall mercury removal. It is also specified that besides activated carbon, other powdery carbonaceous materials with some inherent adsorption activity, such as coal or coke, could also be used. However, these other carbonaceous materials do not normally possess sufficient inherent activity to be effective, even in combination with alkali reagent spray drying.

Activated carbon, the preferred sorbent for sorption of trace contaminants from fluid streams, is a predominantly amorphous solid having an extraordinarily large internal surface area (BET around 1000 $m^2/gm$) and pore volume formed by activating a raw carbonaceous starting material such as coal, wood and biomass. The process of activation, which converts a raw carbonaceous starting material to a material that has a high adsorption capacity, is either a thermal or chemical activation process and can be equipment and energy intensive. Thermal activation typically involves various heating steps to pre-oxidize and de-volatilize the raw carbonaceous starting material followed by activation using steam, carbon dioxide or a mixture thereof at relatively high temperatures, sometimes greater than 800° C. Chemical activation typically involves impregnating the raw carbonaceous starting material with a chemical activating agent and heating the mixture to a temperature between approximately 450–700° C.

Both thermal and chemical processes are normally carried out in large rotary kilns with treatment times of several hours. The raw carbonaceous starting material is typically in the form of either briquettes, pellets or granules to prevent loss of the product through entrainment of fines during processing. Powdered activated carbon is then made by grinding the granular product. Therefore, the chemical and energy requirements to activate raw carbonaceous starting materials can be quite high, resulting in a relatively expensive activated carbon product. In addition, sorbent injection processes designed to remove vapor phase trace contaminants, such as mercury, found in low concentrations in gas streams with short residence times (approximately 1–10 seconds), require very large quantities of sorbent material. Therefore, the total cost for sorbent can be quite high.

In view of the foregoing, there exists a need for an improved method for removing vapor phase contaminants from a gas stream.

SUMMARY OF THE INVENTION

It is a general object of the present invention to provide a method for the removal of vapor phase contaminants from a gas stream.

A more specific object of the present invention is to provide a method for the removal of vapor phase air toxics, such as mercury, from the flue gas of a combustion process.

Another object of the invention is to provide a method for the removal of vapor phase air toxics, such as mercury, from the flue gas of a combustion process by reacting such air toxics with an activated material by injecting a raw carbonaceous starting material into the flue gas and activating it in-situ.

Another object of the invention is to provide a method as described above in which the source of raw carbonaceous starting material is relatively inexpensive, thereby avoiding the significant costs of pelletization, volatilization, activation and grinding associated with the production of commercially available activated carbons.

These objects are achieved by a method of, and apparatus for, activating a raw carbonaceous starting material in-situ in a gas stream, reacting the activated material with vapor phase contaminants and removing the activated material containing the vapor phase contaminants from the gas stream. The method includes the steps of injecting a raw carbonaceous starting material into a gas stream having an activation temperature at, or downstream of, the point of injection and a gas stream residence time sufficient to activate the raw carbonaceous starting material and then reacting this activated material with vapor phase contaminants, such as mercury. The activated material containing the vapor phase contaminants is then removed from the gas stream using a particulate collection device.

In another aspect of the invention, a gas stream source directs a gas stream to an activation region. The gas stream has an activation temperature at the activation region. A raw carbonaceous starting material is positioned at the activation region, such that the gas stream activates the raw carbonaceous starting material into an activated carbonaceous material. The activated carbonaceous material is then at positioned in the exhaust stream of a combustion process to adsorb vapor phase contaminants.

Additional objects and features of the invention will appear from the following description from which the preferred embodiments are set forth in detail in conjunction with the accompanying drawings.

BRIEF DESCRIPTION OF THE DRAWINGS

Identical reference numerals throughout the figures identify common elements.

DESCRIPTION OF THE PREFERRED EMBODIMENTS

Figure 1:
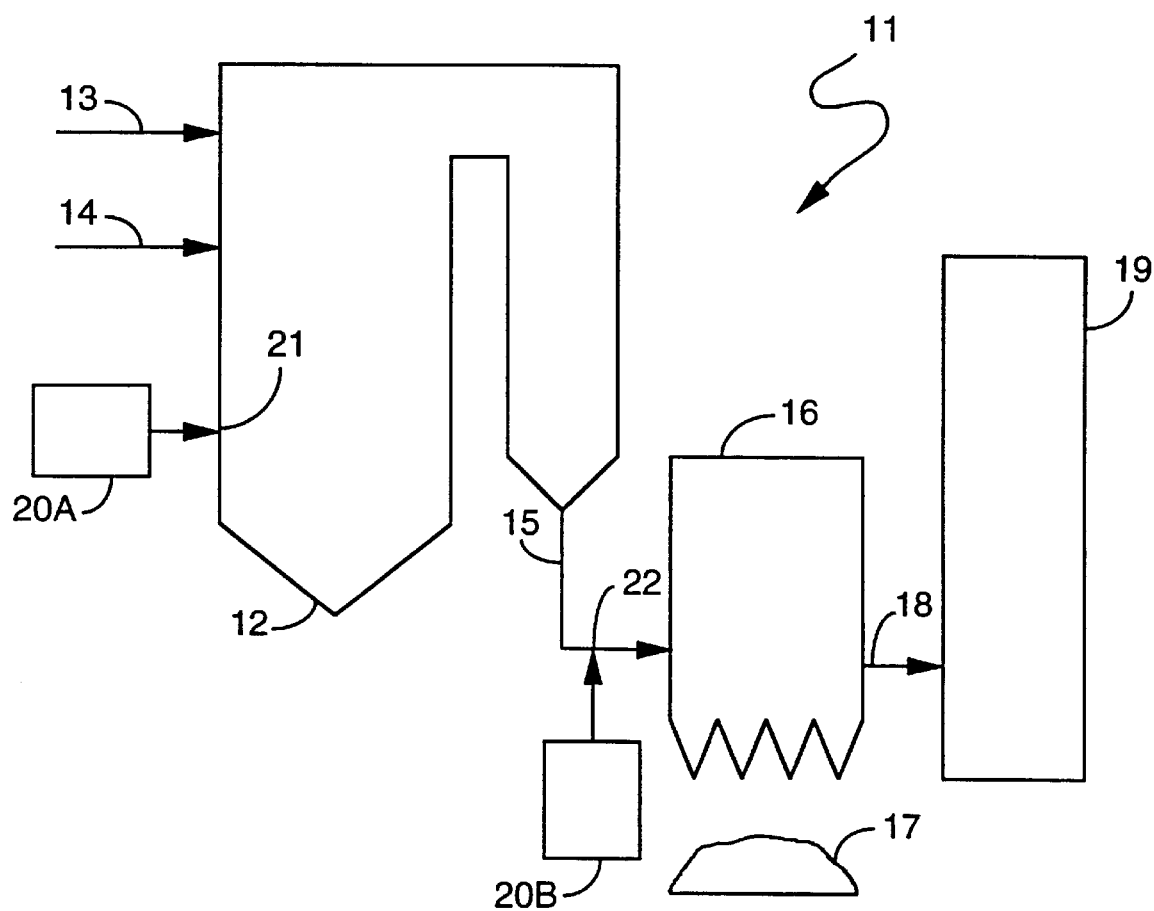
FIG. 1 is a schematic view of an apparatus for removing vapor phase contaminants from the flue gas of a combustion process in accordance with the present invention.

FIG. 1 shows a pollution removal system 11 for use with a combustion source, such as a fossil-fuel-fired boiler 12, which receives air through air inlet duct 13 to combust fuel, such as coal received through fuel inlet duct 14. The combustion process within boiler 12 produces a gas stream in boiler 12 in the form of flue gas which exits the boiler through outlet duct 15. The flue gas produced within the boiler is comprised of air, products of combustion in the gaseous form such as water vapor, carbon dioxide, oxides of nitrogen and sulfur, halides, organic compounds, mercury, selenium and other trace metal vapors and particulate matter. Particulate collection device 16 is connected to outlet duct 15 and removes particulate matter 17 from the flue gas. The particulate collection device outlet duct 18 directs the flue gas to the stack 19 where it is discharged.

Injector 20A injects a raw carbonaceous starting material into the flue gas at injection location 21. It should be appreciated, however, that there may be only one injector and injection location or more than one injector and injection location, and these injection locations can be separately positioned anywhere in boiler 12 or along outlet duct 15. A second injector 20B and a second injection location 22 are shown in FIG. 1. Injectors 20A and 20B can be any mechanical or pneumatic device which feeds the raw carbonaceous starting material in either dry or slurry form into the flue gas stream at the desired injection location.

Figure 2:
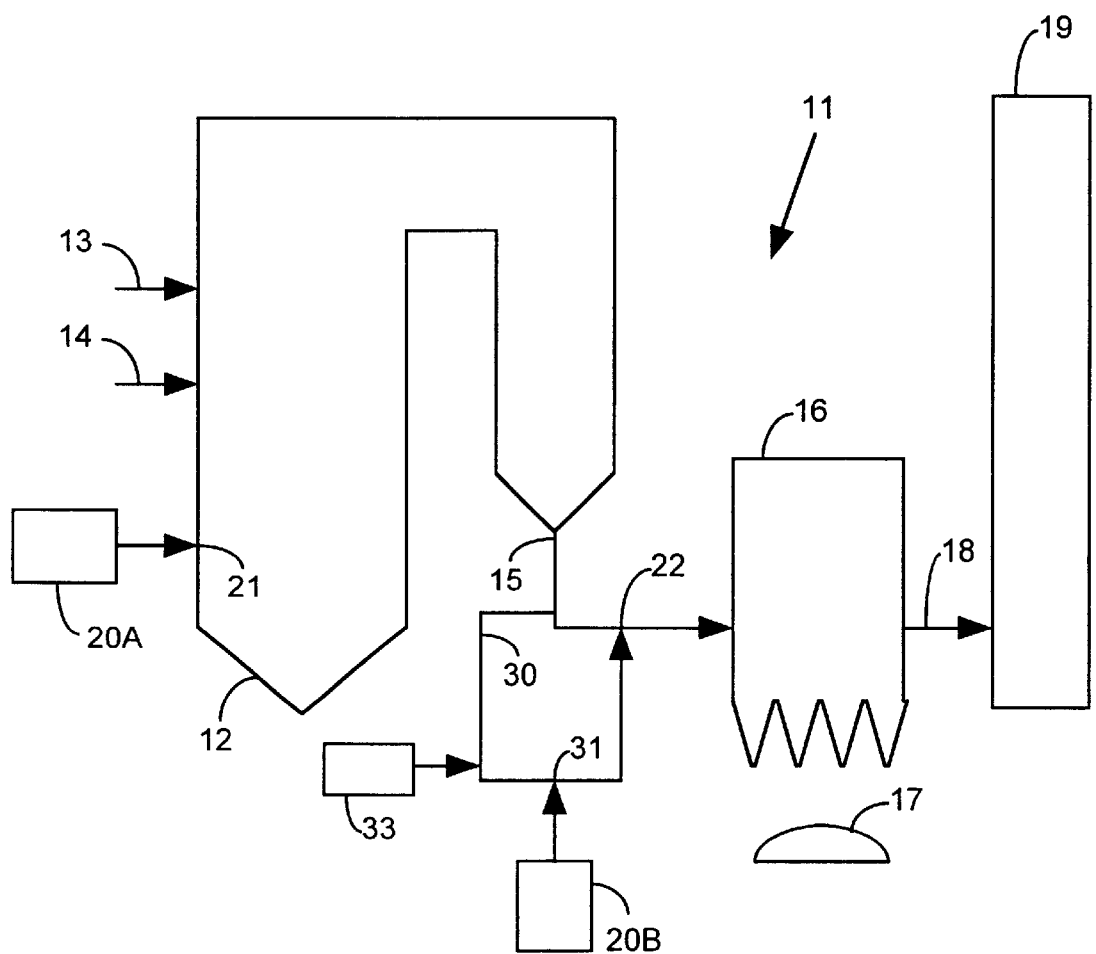
FIG. 2 is a schematic view of another version of an apparatus for removing the vapor phase contaminants from the flue gas of a combustion process in accordance with the present invention.

FIG. 2 shows another embodiment of pollution removal system 11 except that the raw carbonaceous starting material is injected by injector 20B into slip-stream 30 at injection location 31. It should be appreciated that there may be only one injection location or more than one injection location along slip-stream 30, and these injection locations can be positioned anywhere along slip-stream 30. It should also be appreciated that the inlet of slip-stream 30 can be positioned anywhere along outlet duct 15 or can be taken from any location in boiler 12. Further, the outlet of slip-stream 30 can also be positioned anywhere along outlet duct 15. It should be appreciated that injection of the raw carbonaceous starting material into slip-stream 30 can be used in conjunction with other injectors and injection locations which can each be separately positioned anywhere in boiler 12 or along outlet duct 15.

FIG. 2 also illustrates an activation gas generator 33, which produces an activating gas stream. By way of example, the activation gas generator 33 may be a source of steam or $CO_2$. The activating gas stream may be used to supplement the activating function of the gas in the slip stream 30.

Figure 3:
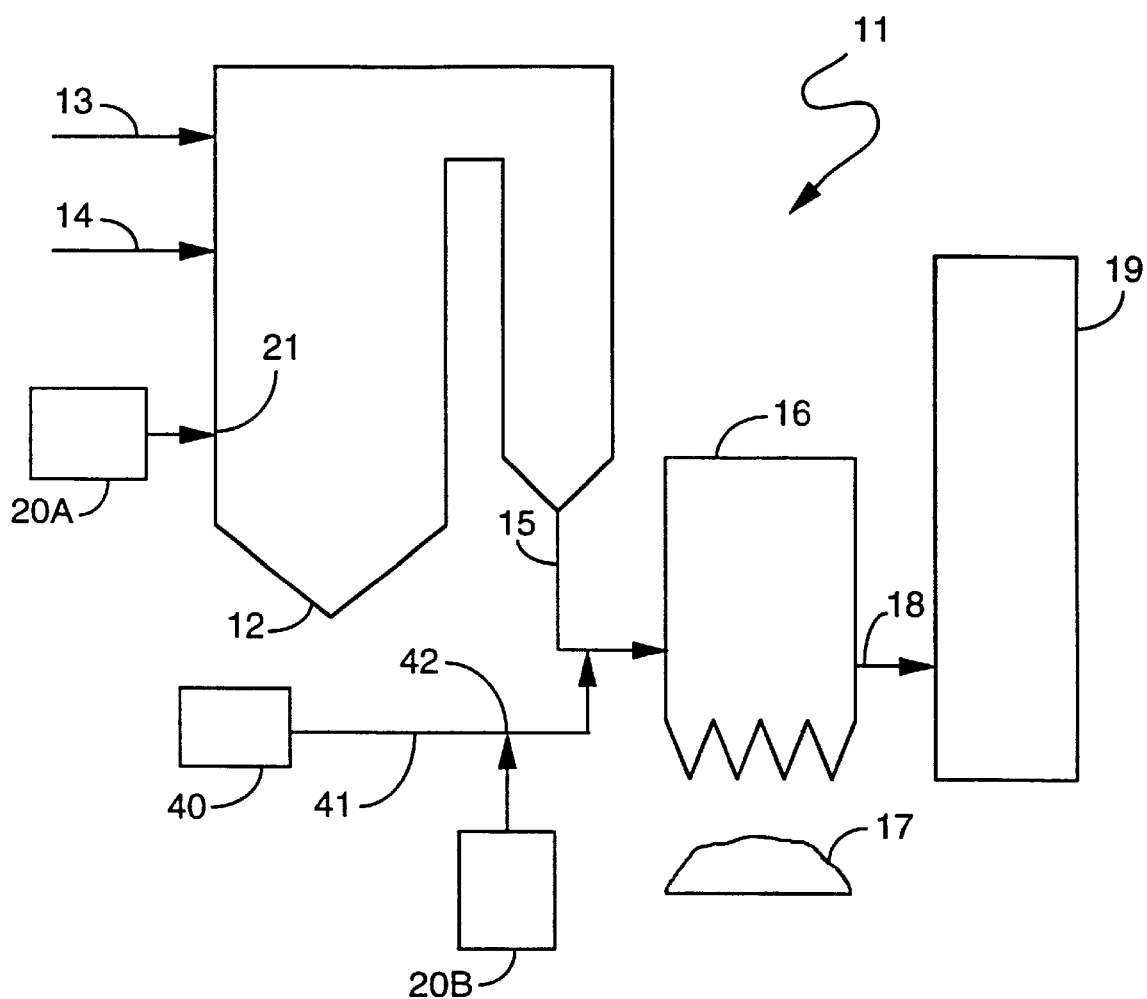
FIG. 3 is schematic view of a third version of an us for removing vapor phase contaminants from the flue gas of a combustion process in accordance with the present invention.

FIG. 3 shows a third embodiment of pollution removal system 11, except that a source 40 of a separate gas stream 41 is shown. This source 40 may be a separate combustor that generates a gas stream, or source 40 may be a waste heat stream that is h generated in a separate process or separate location from the fossil-fuel-fired boiler. Source 40 may also be a gas stream formed by the combination of different gases, for example, by the combination of cylinder gases, which allows for the generation of a particular gas composition and temperature suitable for activating the raw carbonaceous starting material. The raw carbonaceous starting material is injected into gas stream 41 using injector 20B at injection location 42. It should be appreciated that there may be only one injection location or more than one injection location along gas stream 41, and these injection locations can each be separately positioned anywhere along gas stream 41. Further, the outlet of gas stream 41 can be positioned anywhere in boiler 12 or along outlet duct 15. It should also be appreciated that injection of the raw carbonaceous starting material into gas stream 41 can be used in conjunction with other injectors and injection locations, which can each be separately positioned anywhere in boiler 12 or along outlet duct 15. Further, additional sources of gas streams into which raw carbonaceous starting material is injected may be used in combination with other or with other injectors and injection locations, and the outlet of the gas streams from these additional sources, as well as the other injectors and injection locations, may each be separately positioned anywhere in boiler 12 or along outlet duct 15.

In operation and use, the method of the present invention comprises the steps of first injecting a raw carbonaceous starting material directly into the flue gas generated by the combustion process at any location upstream of particulate collection device 16. Alternatively or in addition, the raw carbonaceous starting material may also be injected into flue gas slip-stream 30 and then added back to the flue gas at any location upstream of particulate collection device 16. Alternatively or in addition, the raw carbonaceous starting material may also be injected into a separate gas stream 41 generated by another source 40, such as a separate combustor or a separate process producing a gas stream or a waste heat stream. This separate gas stream is then mixed with the flue gas at any location upstream of particulate collection device 16.

The raw carbonaceous starting material may be any carbonaceous material such as coal, wood, petroleum coke, biomass materials, sewage sludge, organic wastes or other carbonaceous material and can also be a liquid or gas derived from organic liquids such as residual or distillate oils, or organic gases containing hydrocarbons such as methane, ethane, propane, butane, and ethylene or alcohols such as methanol and ethanol. Preferably organic gases contain molecules that have up to about eight carbon atoms. Upon activation, if the raw carbonaceous material is a liquid or gas, cracking, pyrolysis, partial oxidation or gasification occurs to form fine carbonaceous particles, for example, soot. The particle size of the raw carbonaceous starting material, or the fine carbonaceous particles formed from the liquid or gas, should be fine enough to suspend the individual particles in the gas stream. Preferably, the particles are less than about 100 $\mu$m in size. More preferably, the particles are less than about 10 $\mu$m in size. The raw carbonaceous starting material can be injected in either a dry powdery form or as a wet slurry form, such that the heat of the gas stream will evaporate at least some of the suspending fluid, leaving the raw carbonaceous starting material suspended in the gas stream.

The heat of the gas stream into which the raw carbonaceous starting material is injected then acts to heat the injected raw carbonaceous starting material, thereby producing an active material in-situ. It should be appreciated that the raw carbonaceous starting material can be injected into the gas stream at any location depending upon the gas stream temperature. The gas stream must have an activation temperature, which is a gas stream temperature sufficient to activate to some degree the raw carbonaceous starting material. The temperature of the flue gas varies from about 1400° C. in boiler 12 to about 100° C. just upstream of particulate collection device 16. Injection of the raw carbonaceous starting material within this temperature window should be suitable to activate the raw carbonaceous starting material. In the case where the raw carbonaceous starting material is injected into a separate gas stream from a separate source and subsequently combined with the flue gas, it is the activation temperature of the separate gas stream which must be sufficient. It should be appreciated that the activation temperature of this separate gas stream may be adjusted to provide the desired amount of activation. Preferably, if the raw carbonaceous material is a liquid or gas, the activation temperature is between about 500° C. and about 1200° C. so that cracking, pyrolysis, partial oxidation or gasification of the liquid or gas occurs to produce fine carbonaceous particles.

In addition, the gas stream residence time, which is the amount of time that the raw carbonaceous starting material is present in the gas stream into which it is injected, will affect the degree of activation. A gas stream residence time of about 0.1 to about 30 seconds should be suitable to activate the raw carbonaceous starting material. Preferably the gas stream residence time is between about 0.1 and about 5 seconds.

The gas stream for activation can also optionally include additives which can enhance carbon adsorption capacity, such as steam, carbon dioxide, air and sulfur-containing additives, such as elemental sulfur in powder or gaseous form.

The activated material is now available to adsorb vapor phase contaminants contained in the flue gas, such as mercury. The degree of removal of these vapor phase contaminants will be dependent upon the amount of activation achieved with any given raw carbonaceous starting material and the amount of contact between the activated raw carbonaceous starting material and the vapor phase contaminants.

The activated raw carbonaceous starting material containing adsorbed vapor phase contaminants is then removed from the gas stream by use of particulate collection device. This device may be a baghouse, electrostatic precipitator or other similar device which acts to remove particulate matter from a gas stream.

As described above, the injection of a raw carbonaceous starting material into a gas stream at a suitable activation temperature and gas stream residence time will activate or enhance the adsorption capacity of the raw carbonaceous starting material in-situ, thereby producing an activated material. This activated material is then available for adsorption of vapor phase contaminants and can subsequently be removed from the gas stream by use of particulate collection device 16. Therefore, this process allows the use of an inexpensive raw carbonaceous starting material which is activated in-situ, without the use of a commercially expensive activated carbon.

Figure 4:
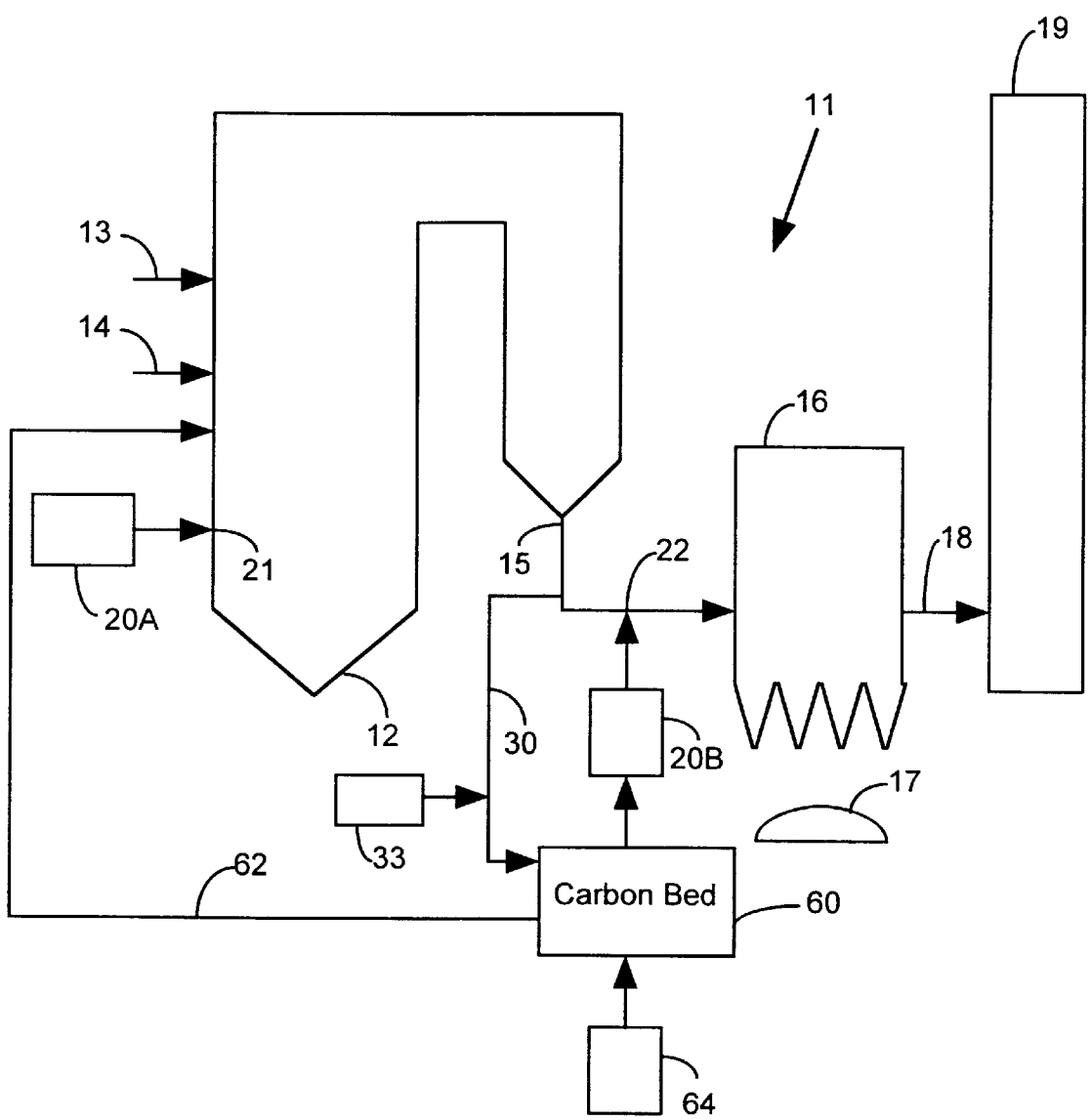
FIG. 4 is a schematic view of an apparatus for activating carbon in a carbon bed with a gas stream from a boiler, in accordance with an alternate embodiment of the invention.

An alternate embodiment of the invention is illustrated in FIG. 4. FIG. 4 illustrates a slip stream 30 applied to a carbon bed 60. The carbon bed 60 starts as a bed of raw carbonaceous material. The gas from the slip stream 30 is applied at a suitable temperature and for an appropriate residence time to activate the raw carbonaceous material.

FIG. 4 also illustrates an activation gas generator 33 of the type described in connection with FIG. 2. The activating gas stream from the activation gas generator 33 may be used to supplement the activating function of the gas in the slip stream 30.

Preferably, the activated carbon from the bed 60 is withdrawn continuously and is applied to the flue gas stream at point 22 using injector 20B. Fresh raw carbonaceous material is added to the carbon bed 60 either continuously or batch-wise from a feeder 64. The exhaust from the bed 60 is recycled to the boiler 12 via duct 62.

Figure 5:
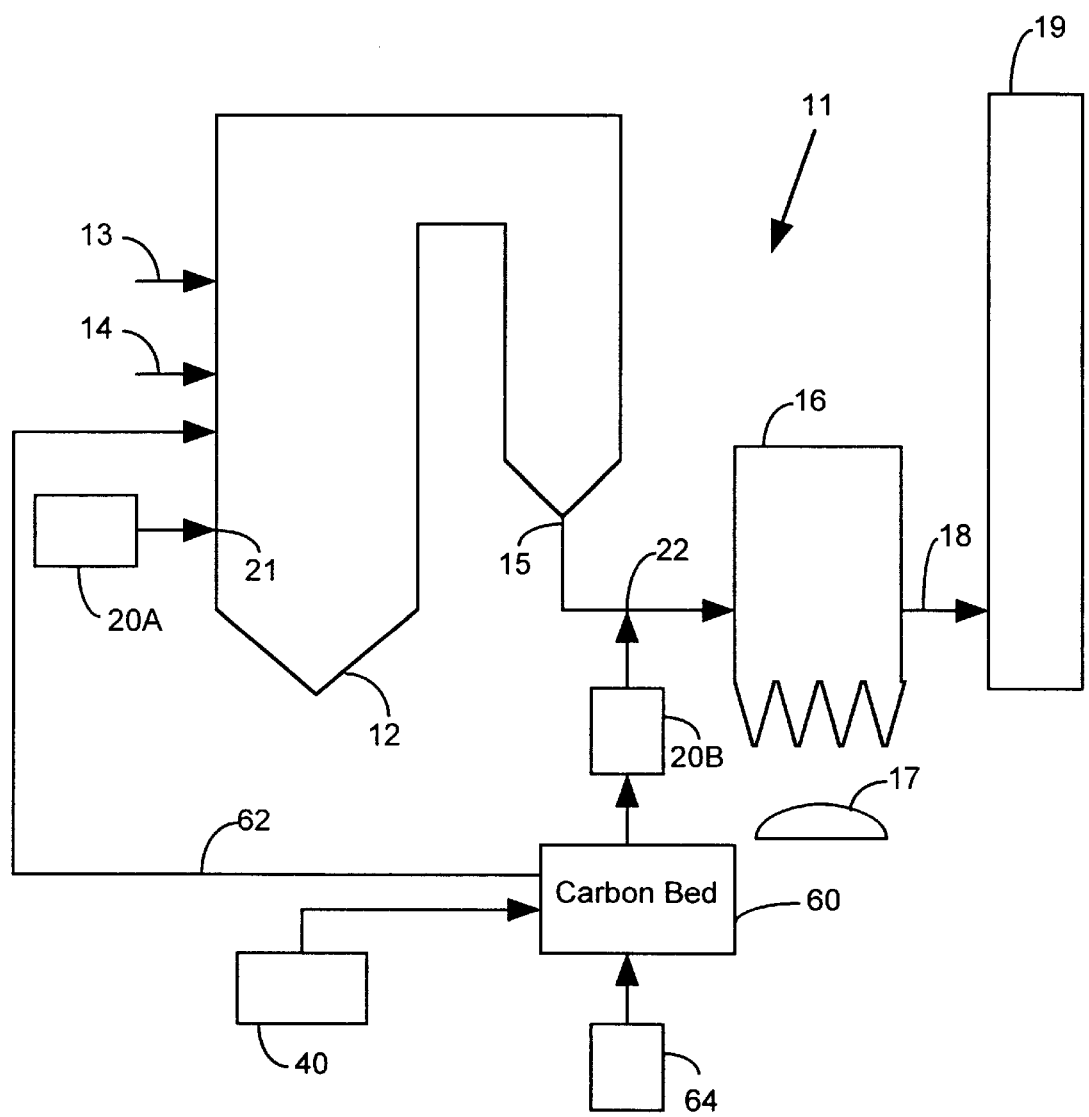
FIG. 5 is a schematic view of an apparatus for activating carbon in a carbon bed with a gas stream from a separate source, in accordance with an alternate embodiment of the invention.

FIG. 5 illustrates an alternate embodiment of the pollution removal system 11. In this embodiment, instead of using a gas stream from an inherent industrial process (e.g., the boiler 12), the gas stream from a separate source 40 is used. The embodiment of FIG. 3 discusses the use of a separate source 40. As previously indicated, the separate source 40 may be a separate combustor that generates a gas stream, or source 40 may be a waste heat stream that is generated in a separate process or separate location from the fossil-fuel-fired boiler. Source 40 may also be a gas stream formed by the combination of different gases, for example, by the combination of cylinder gases, which allows for the generation of a particular gas composition and temperature suitable activating the raw carbonaceous stag material of the carbon bed 60.

The gas from the separate source 40 is applied at a suitable temperature and for an appropriate residence time to activate the raw carbonaceous material of the carbon bed 60. Preferably, the activated carbon from the bed 60 is withdrawn continuously and is applied to the flue gas stream at point 22 using injector 20B. Fresh raw carbonaceous material is added to the carbon bed 60 either continuously or batch-wise from a feeder 64. The exhaust from the bed 60 is recycled to the boiler 12 via duct 62.

In the embodiments of FIGS. 4 and 5, the generated gas stream, whether from the inherent industrial process of the boiler 12 or a separate source 40, preferably has an activation temperature between about 100° C. and about 1400° C. The carbon bed 60 initially comprises an unactivated carbon in the form of a raw carbonaceous starting material, such as coal, wood, petroleum coke, biomass materials, sewage sludge, organic waste and the like. The unactivated carbon forms an unactivated carbon bed, which is any accumulation of unactivated carbon positioned on a substrate. The gas stream is preferably passed through the bed 60, for example by routing the gas stream underneath the bed 60, such that the gas stream passes through the bed 60.

The gas stream for activation can also optionally include additives which can enhance carbon adsorption capacity, such as steam, carbon dioxide, air and sulfur-containing additives such as elemental sulfur in powder or gaseous form.

The carbon bed 60 operates as an activation region to which the gas stream is routed to activate the unactivated carbon. The unactivated carbon bed becomes an activated carbon bed after treatment by the gas stream. In FIGS. 4 and 5 an injector 20B is used to inject an activated carbon into the exhaust stream from the boiler 12. In the previous embodiments of the invention, the injector 20B was used to inject a raw carbonaceous starting material. With the present embodiments, the injector 20B is used to inject the activated carbon. The activated carbon is immediately available to adsorb vapor phase contaminants of the exhaust stream from the boiler 12.

Those skilled in the art will appreciate that the embodiments of the invention shown in FIGS. 4–5 are advantageous because they exploit a gas stream from a separate source 40 to activate the raw carbonaceous starting material. The gas stream from the separate source is typically unutilized, since it has a relatively low temperature. However, in accordance with the invention, the gas stream is exploited to activate a raw carbonaceous starting material.

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, thereby enable others skilled in the art to best utilize the invention and various embodiments with various modifications as are suited to the particular use contemplated. It is intended that the scope of the invention be defined by the following claims and their equivalents.

What is claim is:

1. A method of removing vapor phase contaminants from a gas stream, said method comprising the steps of:

injecting and suspending a raw carbonaceous starting material selected from the group consisting of coal, wood, petroleum coke, biomass materials, sewage sludge, organic waste, organic liquids and organic gases into a gas stream that comprises vapor phase contaminants, said gas stream having an activation temperature that activates, within said gas stream, said raw carbonaceous starting material into an activated carbon material that adsorbs said vapor phase contaminants within said gas stream, wherein said raw carbonaceous starting material and said activated carbon material move concurrently with said gas stream; and collecting said activated carbon material with adsorbed vapor phase contaminants in a particulate collection device.

2. The method as in claim 1 wherein said injecting step includes the step of injecting said raw carbonaceous starting material into said gas stream wherein said activation temperature of said gas stream is between about 100° C. and about 1400° C.

3. The method as in claim 1 wherein said injecting step includes the step of injecting said raw carbonaceous starting material into said gas stream at an injection location such that said gas stream has a gas stream residence time between said injection location and said particulate collection device of between about 0.1 and about 30 seconds.

4. The method of claim 1 wherein said vapor phase contaminants comprise vapor phase mercury.

5. A method of removing vapor phase contaminants from a gas stream, said method comprising the steps of:

injecting and suspending a raw carbonaceous starting material selected from the group consisting of coal, wood, petroleum coke, biomass materials, sewage sludge, organic waste, organic liquids and organic gases into a first gas stream having an activation temperature that activates, within said first gas stream, said raw carbonaceous starting material into an activated carbon material;

mixing said first gas stream with a second gas stream to allow said activated carbon material to adsorb vapor phase contaminants in said second gas stream, wherein said raw carbonaceous starting material and said activated carbon material move concurrently with said first gas stream and with said second gas stream; and collecting said activated carbon material with adsorbed vapor phase contaminants in a particulate collection device.

6. The method as in claim 5 wherein said injecting step includes the step of injecting said raw carbonaceous starting material into said first gas stream where said activation temperature of said first gas stream is between about 100° C. and about 1400° C.

7. The method as in claim 5 wherein said injecting step includes the step of injecting said raw carbonaceous starting material into said first gas stream where said activation temperature of said first gas stream is between about 500° C. and about 1200° C.

8. The method as in claim 5 wherein said mixing step includes mixing said first gas stream with said second gas stream at a mixing location and said injecting step includes the step of injecting said raw carbonaceous starting material into said first gas stream at an injection location such that said first gas stream has a gas stream residence time between said injection location and said mixing location of about 0.1 to about 30 seconds.

9. The method as in claim 5 wherein said first gas stream additionally comprises additives which can enhance carbon adsorption capacity selected from the group consisting of steam, carbon dioxide, air and elemental sulfur.

10. The method as in claim 5 wherein said mixing step includes the step of mixing said first gas stream with said second gas stream which is flue gas from a combustion process.

11. The method of claim 10 wherein said mixing step further comprises the step of mixing said first gas stream and said second gas stream with an activating gas stream from an activation gas generator.

12. The method of claim 5 wherein said vapor phase contaminants comprise vapor phase mercury.

13. A method of activating a raw carbonaceous starting material, said method comprising the steps of:

routing a combustion process gas stream to an activation region, said combustion process gas stream having an activation temperature; and positioning a raw carbonaceous starting material selected from the group consisting of coal, wood, petroleum coke, biomass materials, sewage sludge, organic waste, organic liquids and organic gases that is capable of being suspended in said combustion process gas stream at said activation region, such that said combustion process gas stream activates said raw carbonaceous starting material into an activated carbonaceous material that adsorbs vapor phase contaminants within said combustion process gas stream, wherein said raw carbonaceous starting material and said activated carbon material move concurrently with said combustion process gas stream.

14. The method of the claim 13 further comprising the step of the collecting said activated carbonaceous material with a particulate collection device.

15. The method of claim 13 wherein said routing step includes the step of routing a gas stream with an activation temperature of between about 100° C. and about 1400° C.

16. The method of claim 13 wherein said vapor phase contaminants comprise vapor phase mercury.

17. A method of removing vapor phase contaminants from a gas stream, said method comprising the steps of:

injecting and suspending a raw carbonaceous starting material selected from the group consisting of organic liquids and organic gases into a gas stream that comprises vapor phase contaminants, said gas stream having an activation temperature that activates, within said gas stream, said raw carbonaceous starting material into an activated carbon material that adsorbs said vapor phase contaminants within said gas stream, wherein said raw carbonaceous starting material and said activated carbon material move concurrently with said gas stream; and collecting said activated carbon material with adsorbed vapor phase contaminants in a particulate collection device.

18. The method as in claim 17, wherein said injecting step includes the step of injecting said raw carbonaceous starting material into said gas stream wherein said activation temperature of said gas stream is between about 100° C. and about 1400° C.

19. The method as in claim 17, wherein said injecting step includes the step of injecting said raw carbonaceous starting material into said gas stream at an injection location such that said gas stream has a gas stream residence time between said injection location and said particulate collection device of between about 0.1 and about 30 seconds.

20. The method as in claim 17, wherein said injecting step includes the step of injecting a raw carbonaceous starting material selected from the group consisting of coal, wood, petroleum coke, biomass materials, sewage sludge and organic waste.

21. The method of claim 17, wherein said organic gases are selected from the group consisting of methane, ethane, propane, butane, ethylene, methanol, ethanol, and combinations thereof.

22. The method of claim 17, wherein said organic gases comprise up to about eight carbon atoms.

23. The method of claim 17, wherein said activation temperature is between about 500° C. and about 1200° C.

\* \* \* \* \*

UNITED STATES PATENT AND TRADEMARK OFFICE
CERTIFICATE OF CORRECTION

PATENT NO.    : 6,558,454 B1
DATED         : June 4, 2003
INVENTOR(S)   : Ramsay Chang, Sharon Sjostrom and Massoud Rostam-Abadi It is certified that error appears in the above-identified patent and that said Letters Patent is hereby corrected as shown below:

Title page,
Item [73], Assignee, "Electric Power Research Institute, Inc., Palo Alto, CA (US)" should read -- Electric Power Research Institute, Inc., Palo Alto, CA (US) and The Board of Trustees of the University of Illinois, Urbana, IL (US) --.

Signed and Sealed this

Twenty-eighth Day of October, 2003

JAMES E. ROGAN
*Director of the United States Patent and Trademark Office*